United States Patent [19]

Maxant

[11] 4,381,238
[45] Apr. 26, 1983

[54] CLAMPING DEVICE

[76] Inventor: William T. Maxant, Ayer, Mass.

[21] Appl. No.: 288,802

[22] Filed: Jul. 31, 1981

[51] Int. Cl.³ ............................................. B04B 3/00
[52] U.S. Cl. .................................. 210/231; 210/361; 210/541
[58] Field of Search ............... 210/232, 238, 361, 362, 210/377, 541, 542; 34/38; 269/86–89

[56] References Cited

U.S. PATENT DOCUMENTS

| | | | |
|---|---|---|---|
| 221,806 | 11/1879 | Goubert | 210/361 |
| 222,083 | 11/1879 | Seelye | 269/87 |
| 1,491,868 | 4/1924 | Kunkel | 210/361 X |
| 1,791,605 | 2/1931 | Root | 210/361 |
| 3,011,646 | 12/1961 | Boronkay | 210/361 |
| 4,148,733 | 4/1979 | Gamble | 210/361 |

Primary Examiner—John Adee
Attorney, Agent, or Firm—Donal B. Tobin

[57] ABSTRACT

A clamping device for holding beehive honeycomb frames within the rotating reels of a centrifuge. The clamp includes a pair of parallel bars biased apart by spring pins and held at one end by a hinge pin connected to a holding bracket which is affixed to the inside face of the centrifuge reel. The other end of the spring-loaded parallel bars snaps into bosses mounted on a second holding bracket affixed to the opposite inside face of the centrifuge reel. To remove the clamp, the user extends his hand across the spring-loaded bars and tightens his grip to compress the bars together so that one end of the bars will disengage the bosses. The user then pivots the whole clamp about the hinge pin so that the frames can be removed.

7 Claims, 4 Drawing Figures

CLAMPING DEVICE

BACKGROUND OF THE INVENTION

The present invention relates to a clamping device and more particularly to a clamp for holding beehive honeycomb frames within the rotating reels of a centrifuge to permit a number of frames to be securely held in position during centrifuging and to be quickly and easily loaded and unloaded.

Beekeepers collect honey in honeycombs mounted on rectangular frames. A number of frames are housed in rectangular boxes much like those shown in U.S. Pat. No. 2,875,454. At harvest time the frames are removed from the boxes so that the honey can be extracted from the combs. Extraction can be accomplished by placing the frames in a centrifuge. The frames rotate between two circular reels about a horizontal axis. The honey cells are arranged at an angle to the plane of the frame so that the centrifuging causes the honey to flow from the cells. A number of frames can be arranged parallel to one another and oriented in a radial direction within the reel type centrifuge. The reel of the centrifuge includes two circular plates or wheels connected together, for example, by way of bolts, in spaced apart relationship to form an open reel. Some of the supporting bolts may be notched or otherwise arranged to form hangers for the honeycomb frames. Other bolts may be equipped with fingers which extend between the frames. The notches and fingers provide lateral stability for the frames. It is necessary to hold these frames in the reel so that they will not be dislodged when the reel rotates. The reel may be driven by means of circumferential gear teeth on the edge of the reel or through a belt drive connected to the hub of the reel.

In the past, frames have been clamped into position by individual latches on the notched bolts that hold the reels or by separate bars that can be affixed across these notched bolts after the honeycomb frames are in place. The task of closing individual latches or affixing separate bars can be inefficient. There is a need for a secure clamp for holding the frames in the centrifuge that may be quickly and easily operated and that is strong enough to hold the frame in place over a large variety of rotating speeds.

SUMMARY OF THE INVENTION

The present invention provides a strong, easily operated clamp that may be quickly engaged and disengaged. The clamp includes a pair of parallel bars biased apart by spring pins and held at one end by a hinge pin connected to a holding bracket which is affixed to the inside face of the centrifuge reel. The other end of the spring-loaded parallel bars snaps into bosses mounted on a second holding bracket affixed to the opposing inside face of the centrifuge reel. To remove the clamp, the user extends his hand across the spring-loaded bars and tightens his grip to compress the bars together so that one end of the bars disengages the bosses. The user then pivots the whole clamp about the hinge pin into radial orientation free of the frames so that the frames can be removed. When the user relaxes his grip, the bars will return to their parallel orientation and rest out of the way until the user wishes to clamp the frames again.

In the rest position, the clamp may be placed between two anti-rotation pins projecting from the centrifuge cabinet over the reel so that the reel will not rotate while the frames are being loaded into or removed from the centrifuge. This is particularly useful because the full frames are often heavy and not balanced so that inadvertant rotation during loading can be a problem. Of course, if the reel rotates during loading the whole extraction process can be even more difficult and inefficient. This anti-rotation feature has the further advantage of reducing frame breakage during honey extraction. Since the honeycombs are relatively fragile, one must be careful to avoid unnecessary banging or jostling of the frames during the extraction process. The fragile combs are more susceptible of damage when they are full because they are heavy and the honey can be unevenly distributed about the comb. Thus, the anti-rotation feature of the present clamp is particularly useful.

BRIEF DESCRIPTION OF THE DRAWINGS

These and other features and advantages of the present invention will become apparent from the following description of the preferred embodiment of the invention taken in conjunction with the drawings in which.

DESCRIPTION OF THE PREFERRED EMBODIMENT

Figure 1:
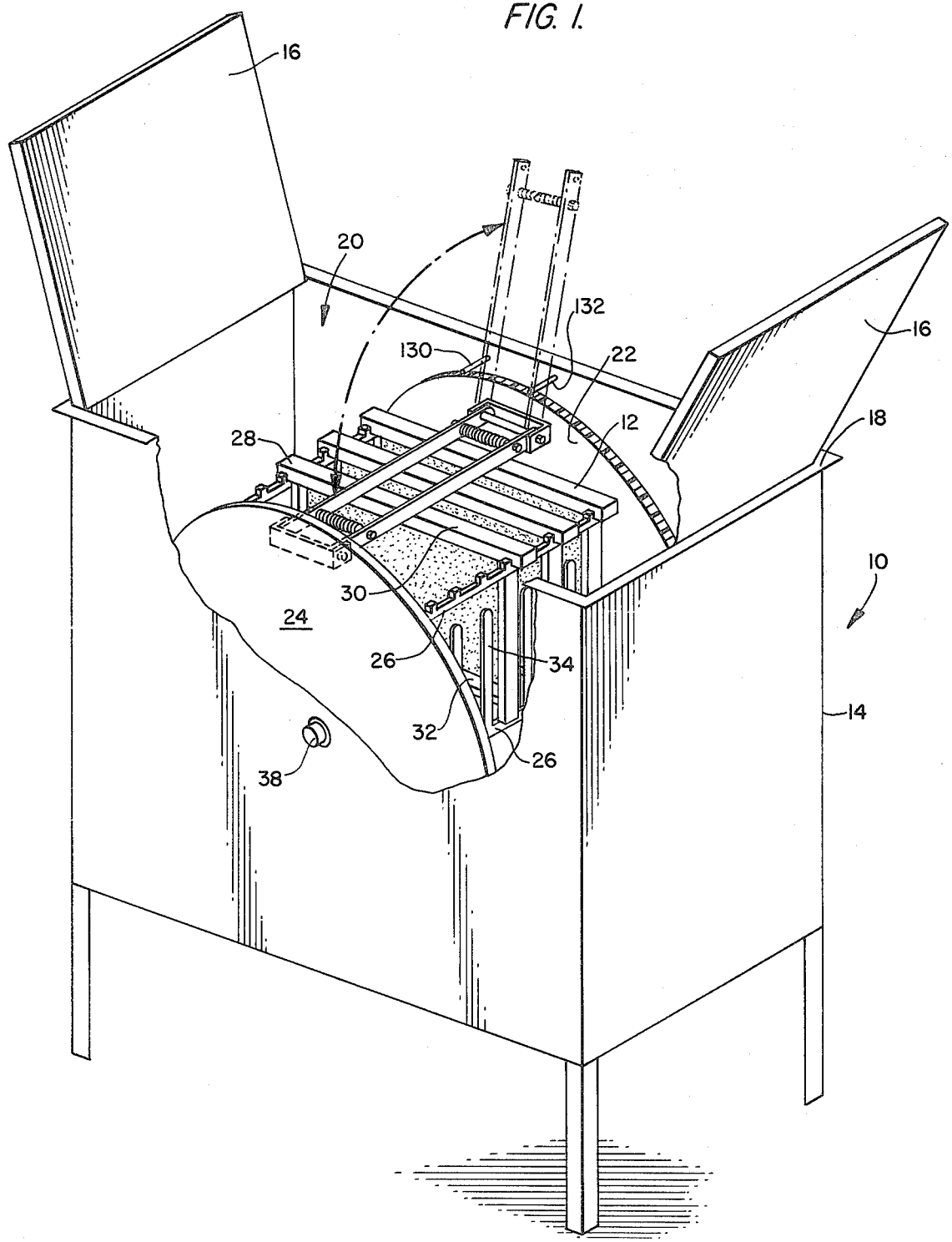
FIG. 1 shows a perspective view, partly in section, of the centrifuge extractor showing a honeycomb frame clamped in position.

Referring to FIG. 1, there is shown a centrifuge 10 for extracting honey from the honeycomb frame 12 of a box-type beehive. Centrifuge 10 is housed in an open top cabinet 14 which may be covered by doors 16 hinged to the upper edges 18 of cabinet 14. Frames 12 are mounted on a reel 20 which includes right and left wheel sections 22 and 24 fixed together with a plurality of supports 26. Supports 26 may be bolted, welded or otherwise permanently affixed to wheels 22 and 24. Certain of the supports 26 may be notched to receive extention 28 extending from the upper frame member 30 of frame 12. Certain other of supports 26 include fingers 34 which extend generally parallel to wheels 22 and 24 to provide lateral support for frames 12. The lower frame members 32 of frames 12 rest between fingers 34. This prevents the frames from moving with respect to the reel during centrifuging. The entire reel 20 is mounted for rotation within cabinet 14 on an axel 38. Reel 20 may be driven by a conventional belt drive and electric motor (not shown) or by placing gear teeth on the circumference of one or both of wheels 22 and 24 which can be driven by a conventional gear train and electric motor (also not shown).

Figure 2:
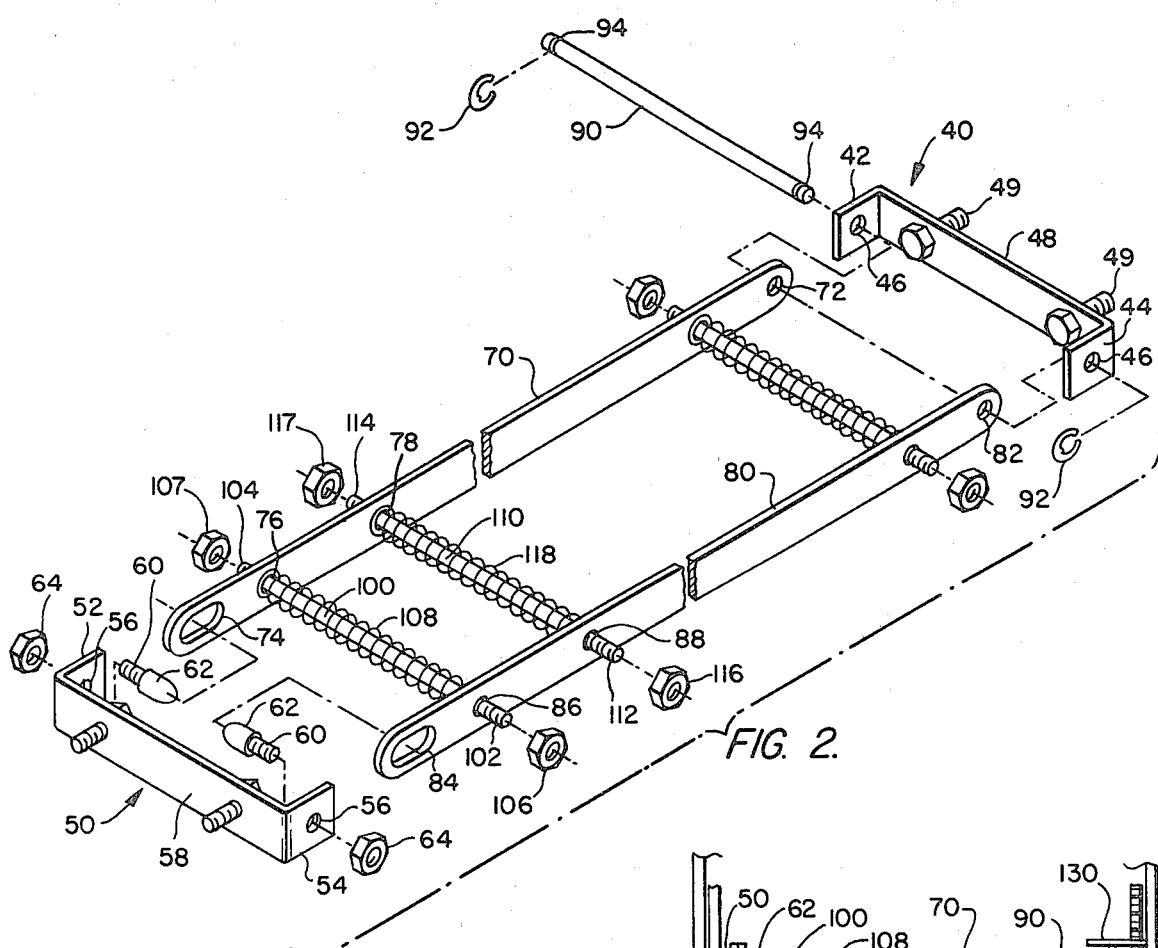
FIG. 2 shows an exploded perspective view of the clamp of the present invention.

Referring now to FIG. 2, there is shown an exploded perspective of the clamp of the present invention. Hinge pin bracket 40 is a generally "U" shaped bracket. The arms 42 and 44 of bracket 40 each have a bore 46 extending through them. The cross piece 48 of brackket 40 is bolted, for example, by bolts 49, welded or otherwise affixed to the inside surface of wheel 22 of reel 20. A similar boss bracket 50, with similar arms 52 and 54 each with a similar bore and a similar cross piece 58 is attached to the confronting surface of wheel 24 of reel 20. Bores 56 are threaded whereas bores 46 are not threaded. Threaded bores 56 of boss bracket 50 each receive the threaded shank 60 of a generally cylindrical boss 62. Boss 62 has a rounded tip. Locking nuts 64 thread onto the portion of shanks 60 which protrude beyond side arms 52 and 54 of boss bracket 50 to lock bosses 62 in place on arms 52 and 54. The bosses 62 face each other and project into the space defined by the "U" shaped boss bracket 50.

Clamp bars 70 and 80 extend between arms 42 and 52 and arms 44 and 54, respectively. Clamp bar 70 includes a hinge pin bore 72 through one end and an enlarged oval boss bore 74 through the other end. At least two spring pin bores 76 and 78 are spaced longitudinally along clamp bar 70. Clamp bar 80 includes a similar hinge pin bore 82, enlarged oval boss bore 84 and at least two similar spring pin bores 86 and 88. Boss bores 74 and 84 fit with a close clearance fit over bosses 62 so that the clamp will not chatter when reel 20 rotates during centrifuging.

Hinge pin 90 extends through bores 46 in arms 42 and 44 of hinge pin bracket 40 and through hinge pin bores 72 and 82 of clamp bars 70 and 80 to pivotably connect clamp bars 70 and 80 to hinge pin bracket 40. "C" rings 92 are received in annular recesses 94 near the opposite ends of hinge pin 90 to hold hinge pin 90 in place and to limit the motion of hinge pin 90 in the axial direction. "C" rings 92 and recesses 94 are dimensioned to permit some small axial motion of hinge pin 90 to facilitate easy rotation of clamp bars 70 and 80 with respect to hinge pin bracket 40. However, loose fitting of these parts should be avoided so that the clamp will not chatter during rotation of reel 20. These dimensions could be chosen to introduce some drag into the rotation of clamp bars 70 and 80, if desirable.

Spring pins 100 extend between clamp bars 70 and 80 and through spring pin bores 76 and 86 with a loose clearance fit. The opposite ends 102 and 104 of spring pin 100 are threaded to receive nuts 106 and 107, respectively. Spring 108 extends between the confronting surfaces of clamp bars 70 and 80 and about spring pin 100 to bias clamp bars 70 and 80 apart against nuts 106 and 107. Nuts 106 and 107 may be locking nuts. Similar spring pin 110 extends between clamp bars 70 and 80 and through clamp bores 78 and 88 with a loose clearance fit. The opposite ends 112 and 114 of spring pins 110 are threaded to receive nuts 116 and 117, respectively. Spring 118 similarly extends between the confronting surfaces of clamp bars 70 and 80 and about spring pin 110 to bias clamp bars 70 and 80 apart against nuts 116 and 117 which may also be locking nuts. Additional spring pins may be used if desired.

Figure 3:
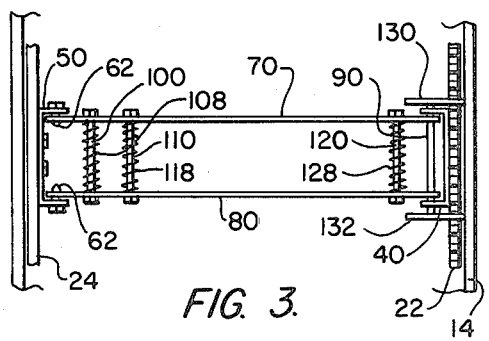
FIG. 3 shows a top schematic view of the clamp in the clamped position.

The operation of the clamp of the present invention will be discussed in connection with FIGS. 3 and 4 in which the clamp is shown schematically using three spring pins. Referring first to FIG. 3, the clamp is shown in the closed position with clamp bars 70 and 80 connected at one end to hinge bracket 40 by hinge 90 and connected at the other end to boss bracket 50 by the interaction of boss bores 74 and 84 over bosses 62. The clamp bars are connected by spring pins 100, 110 and 120 which project through the spring pin bores in the clamp bars as previously explained. The clamp bars 70 and 80 are biased apart by springs 108, 118 and 128. When the clamp bars 70 and 80 are biased apart, boss bores 74 and 84 engage bosses 62 and hold clamp bars 70 and 80 down tight against the surface of any honeycomb frames that may have been placed in reel 20 for centrifuging.

Figure 4:
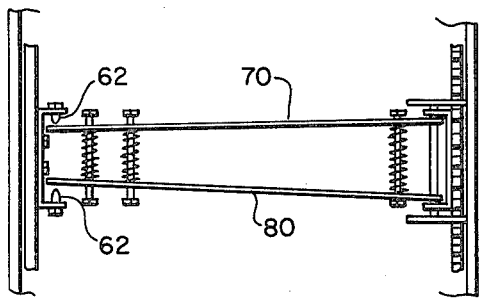
FIG. 4 shows a top schematic view of the clamp as it is being disengaged.

Referring now to FIG. 4, one can observe how easily the clamp of the present invention is disengaged to permit removal of the honeycomb frames from the centrifuge reel. The user merely grasps the clamp by extending his hand across bars 70 and 80 squeezing bars 70 and 80 together against the bias force of springs 108, 118 and 128 until boss bores 74 and 84 disengage bosses 62. The user then pivots the entire clamp about hinge pin 90 out of the way to gain access to the frames on reel 20.

Referring to FIGS. 1, 3 and 4, anti-rotation pins 130 and 132 may be affixed to the inside of cabinet 14 and project over wheel 22 of reel 20. Pins 130 and 132 should be spaced apart slightly more than clamp bars 70 and 80 so that clamp bars 70 and 80 may rest between anti-rotation pins 130 and 132. Thus, if reel 20 starts to roll as one is loading or unloading frames from reel 20, the clamp will hit anti-rotation pins 130 and 132 and since the clamp is fixed to reel 20, reel 20 will not rotate.

While the invention has been illustrated and described in certain preferred embodiments, it will be recognized by those skilled in the art that variations and changes may be made to the preferred embodiment without departing from the scope of the invention. The above specification is considered as exemplary of the principles of the present invention and the invention is not intended to be limited, except as set forth in the following claims.

What is claimed is:

1. In combination, an open reel type centrifuge for extracting honey from a honeycomb frame which may be mounted therein, said centrifuge including a reel supported for rotation therein, said reel having an axel and first and second wheel sections mounted for rotation with said axel in axially spaced apart relationship, and each wheel section aligned generally perpendicular to the axis of said axel and said reel having transverse supports fixed to and extending between said wheel sections to provide structural support for said reel and to provide hangers for said honeycomb frames; and, a clamp for retaining honeycomb frames between said first and second wheels and against said transverse supports of said open reel type centrifuge to hold said honeycomb frames in position against the centrifugal force developed when said reel rotates, said clamp comprising:

first and second clamp bars extending between the wheels of said open reel;

a plurality of spring pins extending between said clamp bars and spaced longitudinally along said clamp bars at points removed from the ends of said clamp bars;

springs disposed about each of said spring pins and biasing said clamp bars apart;

means for pivotably attaching one end of said first and second clamp bars to said first wheel adjacent the circumference thereof so that said clamp may be pivoted out of the way to permit honeycomb frames to be loaded into said reel;

means fixed to said second wheel adjacent the circumference thereof for removebly engaging the other end of said first and second clamp bars whereby said clamp bars may be moved together against the bias force of said springs and pivoted into position against said honeycomb frames and then said clamp bars may be released to engage said other end of said first and second clamp bars with said engagement means to securely hold said honeycomb frames in said reel against the influence of the centrifugal force developed when said reel rotates in said centrifuge.

2. The clamp of claim 1 wherein said engagement means includes first and second bosses disposed in spaced-apart confronting relationship and aligned generally in the direction of said bias springs and said first and second clamp bars include bores for receiving said bosses.

3. The clamp of claim 2 wherein said engagement means includes:
 a "U" shaped boss clamp affixed to said second wheel, each arm of said "U" shaped boss clamp including a threaded bore therethrough;
 said first and second bosses each having a threaded shank portion for threadably engaging one of said threaded bores, and a boss portion, said boss portion projecting from said boss clamp arms in confronting relationship.

4. The clamp of claim 3 wherein said threaded shank portion of said boss projects through and beyond said threaded bore; and, further including locking means threadably engaging said projecting shank portion and locking against the confronting surface of said boss clamp arm.

5. The clamp of claim 1 wherein said pivotable attaching means includes a "U" shaped pivot bracket affixed to said first wheel, each arm of said "U" shaped pivot bracket including a bore therethrough;
 a hinge pin extending through said pivot bracket bores; bores through the end of said first and second clamp bars to receive said hinge pin to provide pivotable attachment of said clamp bars to said first wheel.

6. The clamp of claim 1 wherein each of said clamp bars include a plurality of spring pin bores extending therethrough and spaced longitudinaly therealong and wherein the opposite ends of each of said spring pins projects through said spring pin bores;
 fastening means affixed to the projecting ends of said spring pins to hold said clamp bars in position against the bias force of said bias springs.

7. The clamp of claim 1 further including anti-rotation pins fixedly disposed in spaced-apart relationship so as to project over one of said first and second wheels, the space between said anti-rotation pins being slightly greater than the space between said clamp bars so that when said bars are pivoted out of alignment with said engagement means they will extend between said anti-rotation pins to prevent said reel from rotating.

* * * * *